United States Patent [19]

Okamoto et al.

[11] Patent Number: 4,593,891

[45] Date of Patent: Jun. 10, 1986

[54] VIBRATION-ABSORBING MOUNTING DEVICE WITH HYDRAULIC DAMPING, ESPECIALLY FOR ENGINES

[75] Inventors: Shuichi Okamoto; Motoo Kunihiro, both of Tsu; Zenji Nakajima, Okazaki, all of Japan

[73] Assignees: Kaisha Toyota Jidosha Kabushiki, Aichi; The Toyo Rubber Industry Co., LTd., Osaka, both of Japan

[21] Appl. No.: 555,902

[22] Filed: Nov. 28, 1983

[51] Int. Cl.⁴ .................................................. F16M 1/00
[52] U.S. Cl. ................................. 267/140.1; 248/562
[58] Field of Search ............... 267/8 R, 35, 113, 114, 267/122, 123, 140.1, 140.3, 141, 141.4, 63 R; 180/300; 248/562, 631, 634, 636

[56] References Cited

U.S. PATENT DOCUMENTS

| | | | |
|---|---|---|---|
| 2,115,072 | 4/1938 | Hunt et al. | 267/35 X |
| 2,539,443 | 1/1951 | Lee | 267/140.3 |
| 2,599,469 | 6/1952 | Merry | 267/63 R X |
| 2,818,249 | 12/1957 | Boschi | 267/35 X |
| 3,315,951 | 4/1967 | Boschi et al. | 267/63 R X |

FOREIGN PATENT DOCUMENTS

| | | | |
|---|---|---|---|
| 0200742 | 12/1982 | Japan | 267/35 |
| 0170935 | 10/1983 | Japan | 267/35 |
| 0606815 | 10/1948 | United Kingdom | 267/141 |

*Primary Examiner*—Duane A. Reger
*Assistant Examiner*—Robert J. Oberleitner
*Attorney, Agent, or Firm*—Flynn, Thiel, Boutell & Tanis

[57] ABSTRACT

A vibration-absorbing engine mounting device with fluid damping which comprises: an upper mounting member, a lower mounting member, a rubber wall body interposed between both the mounting members with its upper and lower portions being air-tightly bonded to the upper and lower mounting members, respectively, a block damper transversely provided in the rubber wall body, and a capsule encased in a space enclosed by the former four members, thus defining a closed chamber enclosed by the former five members. The capsule comprises an exterior rigid case, an interior sealed bag encapsulated in the rigid case, defining a sacciform chamber and an orifice member entering the former two. The closed chamber and the sacciform chamber are filled with fluid, whereby they are put in communication with one another by the passage of fluid via the orifice member.

5 Claims, 1 Drawing Figure

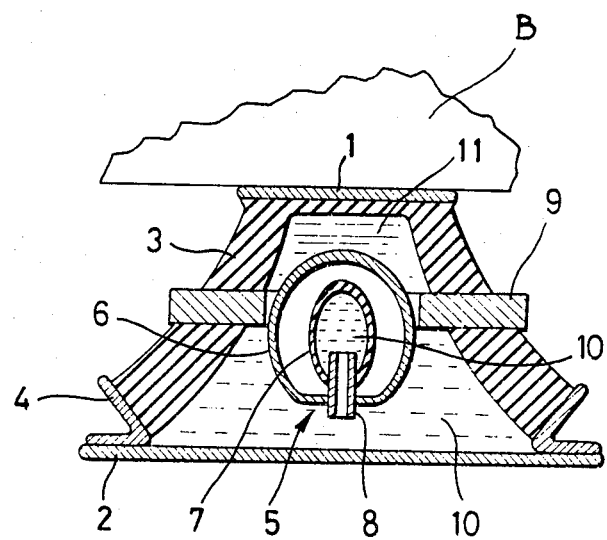

VIBRATION-ABSORBING MOUNTING DEVICE WITH HYDRAULIC DAMPING, ESPECIALLY FOR ENGINES

FIELD OF THE INVENTION

This invention relates to a vibration-absorbing mounting device especially used for mounting an automobile engine upon a vehicle chassis in a vibration-absorbing manner.

BACKGROUND OF THE INVENTION

In bearing or supporting an engine mounted on an automobile in a vibration-absorbing manner, because of the fact that the number of rotations per minute of the engine per se changes over a wide range, a vibration-absorbing mounting device is required that is capable of fulfilling two requirements, namely, the damping rate relative to large-amplitude, low-frequency oscillations which are generated upon running at a low speed be large; and the vibration insulation capacity against high frequency oscillations occurring at high speed be large.

Vibration-absorbing mounting devices of this kind which are constituted of rubber or an air spring having a high damping material cannot retain effective vibration insulation performance over a wide range of oscillations since enhancing damping capacity against low frequency oscillations makes dynamic spring characteristics large and conversely, improving dynamic spring characteristics leads to the result that the damping capacity against low frequency oscillations is not exhibited.

In order to alleviate such drawbacks or disadvantages as described above, extensive research and development has been conducted pursuing vibration-absorbing mounting devices capable of exhibiting substantial, good vibration-absorbing properties against both high and low frequency oscillations. Just all-round vibration-absorbing mounting devices of various shapes have heretofore been proposed. Among them, for instance, there is known a vibration absorbing mounting devices with fluid damping with which the damping function against oscillations can be shared by a sealed fluid and the vibration function can be shared by a rubber layer.

OBJECTS OF THE INVENTION

It is the principal object of the present invention to provide an improved vibration absorbing mounting device with hydraulic damping of this type having a new construction which is capable of affording more effective insulation performances against the oscillations based on high speed rotation of an engine and the abnormal noises generated upon starting and acceleration or decceleration of an engine.

Another object of the invention is to provide a vibration damping mounting device, especially for mounting a motorcar engine upon a vehicle chassis whereby the disadvantage of previous systems can be avoided.

SUMMARY OF THE INVENTION

These objects and others which will become apparent hereinafter are attained, in accordance with the present invention, by a vibration-absorbing mounting device with hydraulic damping, especially for engines, in which a chamber having a variable volume associated with an orifice member for passage of fluid therethrough is in the form of a capsule, the orifice member exhibiting damping performances against low frequency oscillations on driving at a low speed and the chamber is encased sealingly with a fluid-filled chamber having a large mechanical strength whereby the mounting device is made compact and stout; and a mass damper is provided, thereby to allow the device to exhibit good vibration insulation characteristics to dull sounds in the median frequency region and to transparent sounds in the high frequency region.

More specifically stated, the vibration-absorbing mounting device according to this invention comprises an upper mounting member of metal, a lower mounting member of metal, a rubber cylindrical wall body interposed between the upper and lower mounting members with its upper portion and its lower portion being airtightly and firmly connected with the upper mounting member and the lower mounting member, respectively, a ring-shaped block damper transversely provided in the rubber cylindrical wall body at the intermediate portion thereof and a capsule encased in a space enclosed by the foregoing members, thus defining a closed chamber enclosed by all the foregoing members, i.e. the rubber cylindrical wall body, the upper and lower mounting members, the capsule and the block damper, the capsule constituting a double-chamber construction in which a sealed bag capable of changing its volume by expansion and contraction and of communicating, by way of an orifice member, with the closed chamber is encased in a rigid case, and the closed chamber and the sealed bag being filled with a damping fluid therein.

BRIEF DESCRIPTION OF THE DRAWING

The invention will be hereinafter described in greater detail by way of example with reference to the accompanying drawing in which:

The single FIGURE is a schematic elevational view in cross-section showing one example of the vibration absorbing mounting device according to this invention.

DESCRIPTION OF THE INVENTION

The vibration-absorbing mounting device shown in the drawing comprises, as primary constituent members, an upper mounting member 1 of metal for securement to an automobile engine body, a lower mounting member 2 of metal for securement to an automobile vehicle chassis, a generally cylindrical rubber wall body 3, a housing member 4, a capsule 5 and a mass damper 9.

The term, "cylindrical" for the rubber cylindrical wall body 3 shall be used herein in its broad sense. Accordingly, the rubber cylindrical wall body 3 assumes a generally cylindrical shape, namely, a cylindrical shape, a frustum shape or an inverted bowel-like shape as in the drawing, a barrel-like shape, or the like. Its top portion is integrally secured to the upper mounting member 1 and its bottom circumferential periphery is integrally secured to the housing member 4 of annular shape.

The mass damper 9 is ring shaped and is transversely provided in the longitudinally median portion of the rubber cylindrical wall body 3 so as to be air-tightly integral or sealed thereto.

It is required that the connections between the upper mounting member 1 and the rubber cylindrical wall body 3, between the housing member 4 and the rubber cylindrical wall body 3, between the mass damper 9 and the rubber cylindrical wall body 3 be subjected to complete fluid-tight treatment and that they have sufficient durability to mechanical external forces. To that end, adhesive bonding by vulcanization is a suitable treatment means.

The housing member 4 serves to reinforce the rubber cylindrical wall body 3 and also functions as a supporting foundation for the rubber cylindrical wall body 3 by the integral adhesion to the lower mounting member 2.

The lower mounting member 2 and the housing member 4 are fluid-tightly and firmly secured to one another in this way, so that there is defined a fluid-tight, closed space enclosed by both the mounting 1, 2, the rubber cylindrical wall body 3, the mass damper 9, the capsule 5 and the housing member 4. The closed space constituting a closed chamber 11 is filled with a damping fluid 10 such as water.

The capsule 5 constitutes a double-chamber construction in which a sealed bag 7 made of an elastomer such as rubber capable of changing volume by expansion and contraction is encased in a fluid-tight rigid case 6 formed of a sheet material having a stiffness such as rigid plastics or metal and an orifice member 8 such as narrow tube is fluid-tightly provided entering the rigid case 6 and the sealed bag 7 whereby the sacciform chamber of the sealed bag 7 is put in communication with the closed chamber 11 outside the rigid case 6 by way of the orifice member 8.

The hollow space of the capsule 5 existing between the rigid case 6 and the sealed bag 7 holds an appropriate volume accommodated to the volume of the closed chamber filled with fluid 10 and is sealed with atmospheric air or plenum air (at a higher pressure than the atmospheric pressure) therein.

The capsule 5 is floated in the fluid 10 of the closed chamber 11 or captively held to a portion (not shown) of the rubber cylindrical wall body 3.

The vibration-absorbing mounting device thus constructed is surrounded, at its external part, by the upper and lower mounting members of metal 1, 2, the housing member 4 and the mass damper 9 both as a stout member, and the tough cylindrical wall body constructed of a heavy-gauge rubber layer, so that it has a large mechanical strength.

In the state of supporting an engine on the mounting device, the pressure exerted on the closed chamber 11 and the pressure within the sealed air space of the capsule 5 are balanced, and as a consequence, the sealed bag 7 retains its initial definite shape.

When an engine is actuated and oscillated, the rubber cylindrical wall body 3 is subject to a dynamic compressive flexure and exhibits dynamic spring characteristics, thereby functioning as a vibration absorber. Concurrent with the flexure of the rubber cylindrical wall body 3, the fluid-filled chamber 11 changes its volume, responsive to which the fluid 10 is admitted to or released from the sacciform chamber of the sealed bag 7 via the orifice member 8. Therefore, a high damping capacity against oscillations is obtained depending on the throttling effect of the fluid passing through the orifice member 8.

The mass damper 9 transversely provided in the median portion of the rubber cylindrical wall body 3 functions, on the one hand, as a damper relative to the transmission of the vibrations in compression directions to the rubber cylindrical wall body 3. On the other hand, it functions to keep the spring rate of the vibration-absorbing mounting device per se large relative to the vibrations in shear directions.

It is possible to make the resonance frequency of the mass damper 9 to the vibrations in the compression directions for example 350 Hz and make that to the vibrations in the shear directions for example 150 Hz by choosing appropriately weight, radius and thickness of the mass damper. By this construction, the mass damper can exhibit the function of absorption of transparent engine sound on the order of 300 to 600 Hz, thus contributing greatly to quiet driving comfort.

Should there occur breakage of the sealed bag 7 during the use of the vibration-absorbing mounting device, then there is no more than the occurrence that the sealed air between the sealed bag 7 and the rigid case 6 shifts into the rubber cylindrical wall body 3 and there is no disadvantage of the fluid 10 leaking out of the mounting device. If it runs into such situations, the decrease in damping capacity to vibrations is not avoidable, but it can retain the loading capacity of heavy-weight goods.

Advantages and effects peculiar to and attainable by this invention are summarized below:

(a) The rubber cylindrical wall body 3 exhibits, when subjected to dynamic compressive flexure, dynamic spring characteristics effective for vibration-absorption and the throttling action of the fluid passing through the orifice member 8 causes to exhibit a high damping capacity to vibrations. Further, the mass damper 9 has an insulation effect on a dull sound in the median frequency region of 100–150 Hz and on a transparent sound in the high frequency region of 300–500 Hz. Thus, optimal vibration-absorbing function is sufficiently exhibited by the combination of these three members.

(b) The portion of the mounting device that has the damping function against oscillations, especially low frequency oscillations is constructed of a capsule which is immersed sealingly in the fluid within the stout, strong assembly comprising the upper and lower mounting members 1, 2, the rubber cylindrical wall body 3 and the mass damper 9, so that the mounting device thus obtained has a toughness to external forces and a long life durability.

(c) As compared with a prior art vibration-absorbing mounting devices of the type in which a fluid is passed through two upper and lower partitioned chambers by way of a throttle, the mounting device of this invention attains the same effect by lessening the height dimension. Accordingly, the structure of the mounting device can be made compact.

(d) Should the sealed bag 7 of the capsule 5 be broken during use, there is no leakage of fluid 10 at all and there is no more than the decrease in damping function. As a consequence, the heavy-weight loading capacity can be retained and hence, a higher reliability is obtained as compared with prior art mounting devices with which frequency of exchange with a new device is high because of liability to cause leakage of the fluid.

Thus, the vibration-absorbing mounting device with fluid damping according to this invention is very useful for mounting engines thereon.

The embodiments of the invention in which an exclusive property or privilege is claimed are defined as follows:

1. A vibration-absorbing engine mounting device with hydraulic damping, comprising:
   an upper mounting means;
   a lower mounting means;
   a resilient wall means interposed between said upper and lower mounting means, said wall means having an upper portion and a lower portion firmly and air-tightly bonded to said upper mounting means and said lower mounting means, respectively;

a ring-shaped mass damper transversely and air-tightly provided in said resilient wall means at an intermediate portion thereof;

means defining a closed chamber enclosed by said mounting means, and resilient wall means and said mass damper;

capsule means including a sealed exterior rigid case oriented wholly inside said closed chamber means;

an inflatable and deflatable sealed bag capable of changing its volume by expansion or contraction, said bag being wholly encased in said sealed rigid case;

a volume of gas sealed between said sealed bag and said rigid case;

an orifice member in said sealed bag and extending through said sealed rigid case to said closed chamber means, the interior of said sealed bag communicating with said closed chamber by way of said orifice member, said sealed bag and said closed chamber being filled with a damping fluid, the rate of fluid exchange between the interior of said sealed bag and said closed chamber being controlled by a throttle effect of said orifice member, whereby the combination of said resiliency of said resilient wall and said throttle effect of said orifice member provide the vibration-absorbing characteristic of said engine mounting means; and wherein said rigid case is oriented in said closed chamber so as to be wholly surrounded by said damping fluid.

2. The vibration-absorbing engine mounting device as claimed in claim 1, further including a housing member for supporting said resilient wall means, which housing member is airtightly, integrally bonded to said lower mounting means and to said resilient wall means.

3. The vibration-absorbing engine mounting device as claimed in claim 1, wherein said gas is at least one of an atmospheric pressure and a plenum air pressure.

4. The vibration-absorbing engine mounting device as claimed in claim 3, wherein said pressure within said hollow space and a pressure imposed on said damping fluid in said closed chamber in response to a mounting of an engine on said upper mounting means are balanced.

5. A vibration-absorbing engine mounting device with hydraulic damping, comprising;

an upper mounting means;

a lower mounting means;

a resilient wall means interposed between said upper and lower mounting means, said wall means having an upper portion and a lower portion firmly and air-tightly bonded to said upper mounting means and said lower mounting means, respectively;

a ring-shaped mass damper transversely and air-tightly provided in said resilient wall means at an intermediate portion therof;

means defining a closed chamber enclosed by said mounting means, said resilient wall means and said mass damper;

capsule means including a sealed exterior rigid case oriented wholly inside said closed chamber means;

an inflatable and deflatable sealed bag capable of changing its volume by expansion or contraction, said bag being wholly encased in said sealed rigid case; and an orifice member in said sealed bag and extending through said sealed rigid case to said closed chamber means, the interior of said sealed bag communicating with said closed chamber by way of said orifice member, said sealed bag and said closed chamber being filled with a damping fluid, said capsule means being floatingly supported in said damping fluid.

* * * * *